United States Patent [19]
Hitachi et al.

[11] Patent Number: 5,110,561
[45] Date of Patent: May 5, 1992

[54] EXHAUST GAS CLEANING DEVICE

[75] Inventors: Yuzo Hitachi; Haruo Serizawa, both of Shizuoka, Japan

[73] Assignee: Usui Kokusai Sangyo Kabushiki Kaisha, Japan

[21] Appl. No.: 517,794

[22] Filed: May 2, 1990

[30] Foreign Application Priority Data

May 8, 1989 [JP] Japan ..................... 1-52419

[51] Int. Cl.$^5$ .......................... B01J 35/04; F01N 3/28
[52] U.S. Cl. .................... 422/180; 422/190; 422/193; 422/222; 55/385.3; 55/488; 55/489; 55/520; 55/DIG. 30; 60/299; 60/301; 60/322
[58] Field of Search ............... 422/180, 190, 193, 222; 55/385.3, 486, 488, 489, 520, 525, DIG. 30; 60/299, 301, 322; 423/213.2, 213.5

[56] References Cited

U.S. PATENT DOCUMENTS

| | | | |
|---|---|---|---|
| 3,770,389 | 10/1973 | Kitzner et al. | 422/174 |
| 4,072,471 | 2/1978 | Morgan, Jr. et al. | 422/171 |
| 4,220,625 | 9/1980 | Toh et al. | 422/180 |
| 4,282,186 | 8/1981 | Nonnenmann et al. | 422/180 |

*Primary Examiner*—Lynn Kummert
*Attorney, Agent, or Firm*—Lowe, Price, LeBlanc & Becker

[57] ABSTRACT

An exhaust gas cleaning device is constructed of a honeycomb core body. The honeycomb core body is formed by superposing a planar band made of a metal sheet and a corrugated band made from another metal sheet, one over the other in a contiguous relationship, and then rolling the thus-superposed planar band and corrugated band together into a multilayered spiral form, defines a number of network-patterned axial gas flow passages, and is further processed to carry an exhaust gas cleaning catalyst thereon. The honeycomb core body defines, along the central axis of rolling thereof, an open cylindrical hollow space of a diameter $\phi_2$ satisfying the following formula:

$$\frac{20}{100} \cdot \phi_1 \leq \phi_2 \leq \frac{95}{100} \cdot \phi_1$$

wherein
$\phi_1$ is the outer diameter of the honeycomb core body, and
$\phi_2$ is the outer diameter of the cylindrical hollow space.

In other aspects of the invention, reinforcing cylinders or ribs are disposed to strengthen the overall structure.

12 Claims, 5 Drawing Sheets

EXHAUST GAS CLEANING DEVICE

BACKGROUND OF THE INVENTION

1) Field of the Invention

The present invention relates to an exhaust gas cleaning device constructed of a metal-made honeycomb core body for carrying an exhaust gas cleaning catalyst. As a cleaning means for exhaust gas from a motor vehicle, the exhaust gas cleaning device is generally installed at an intermediate point of an exhaust pipe.

More specifically, this invention is concerned with an exhaust gas cleaning device having a special structure suitable where exhaust gas contains a lot of HC (hydrocarbons) and exothermic reactions abruptly take place between the exhaust gas and an exhaust gas cleaning catalyst or where a preheater is required to meet temperature conditions suitable for a catalyst layer upon activation of an exhaust gas cleaning device of the above sort.

2) Description of the Related Art

Exhaust gas cleaning devices of the above sort have conventionally been fabricated in the following manner. A planar band made of a heat-resistant steel sheet and a corrugated band obtained by forming a similar steel sheet into a wavy or sinuous form are superposed one over the other in a contiguous relationship and are rolled together into a multilayered spiral form, thereby forming a honeycomb-shaped multilayered composite body (hereinafter called the "honeycomb core body"), axially defining a number of network-patterned gas flow passages for allowing exhaust gas to flow therethrough. The honeycomb core body is then inserted into a cylindrical metal casing which is open at both ends thereof.

The honeycomb core body and metal casing are thereafter firmly joined together by brazing or welding, so that they can withstand thermal expansion and stress due to the high temperature of exhaust gas, exothermic reactions of the exhaust gas induced by the catalyst, and the like and further, vibrations while the associated motor vehicle is running. Needless to say, the planar and corrugated bands which make up the honeycomb core body can be firmly joined together at contacts therebetween by any one of various suitable methods.

There is however a recent move toward constructing an exhaust gas cleaning device without a metal casing which is adapted to receive and firmly fix a metal-made honeycomb core body. In other words, with the metal-made honeycomb core body alone, i.e., without the need to provide a metal casing fixed to the outside of the metal honeycomb body, the structure of this invention has an advantage from the standpoint of the price competition with, for example conventional cordierite ceramic carriers. The omission of such an outer casing naturally leads to a reduction in the cost for inserting a metal-made honeycomb core body in the metal casing and then uniting them together, i.e., in the so-called canning cost, whereby substantial cost savings can be realized.

The conventional exhaust gas cleaning devices constructed of a honeycomb core body alone and the conventional exhaust gas cleaning devices constructed of a honeycomb core body and a metal casing are however both unsuitable, for example, for the following application purposes because of the structure of the honeycomb core body.

The conventional honeycomb core body requires further improvements, for example, for such application purposes as to be described next since the planar band and the corrugated band are rolled tight from the center into the multilayered form.

(i) Upon cleaning exhaust gas of a high HC concentration as is observed in the case of a motor cycle or the like, the flow rate distribution of the exhaust gas is highest at a central part (i.e., the center of rolling) of the honeycomb core body. This central part is therefore exposed to abnormally high temperatures due to catalytic exothermic reactions of the exhaust gas induced by an exhaust gas cleaning catalyst such as Pt or Pd, whereby thermal stress is developed and the durability of the device itself is lowered accordingly. As is known well, the temperature inside an exhaust gas cleaning device of this sort generally ranges from 700° C. to 800° C. This temperature may, however, increase to as high as 1,200° C. where HC is discharged at a high concentration.

(ii) When it is desired to activate a honeycomb core body of this sort, the temperature of exhaust gas has not yet risen to a temperature level optimal for catalytic reactions in many instances. A heating means can be used to heat up the catalyst zone to the optimal temperature. In some cases, an additional exhaust gas cleaning device is therefore used as a preheater so as to effectively use heat to be produced by catalytic exothermic reactions of exhaust gas as has been described above. Use of the above-described conventional honeycomb core body however leads to a substantial pressure loss, resulting in a reduction in the engine output.

If the openings of the network-patterned air flow passages are enlarged or coarsened to reduce the pressure loss (resistance to flow) due to the honeycomb core body, the rigidity of the honeycomb core body becomes insufficient so that the durability of the honeycomb core body is reduced.

SUMMARY OF THE INVENTION

With a view toward solving the above-described drawbacks of the conventional exhaust gas cleaning devices, the present inventors have conducted an extensive investigation on the structure of the honeycomb core body. As a result, it has been found that metal-made honeycomb bodies of this sort can be used in certain new fields by forming cylindrical hollow spaces of predetermined outer diameters along the central axes of rolling of the honeycomb core bodies, leading to the structure of the present invention.

In one aspect of the present invention, there is thus provided an improved exhaust gas cleaning device comprising: a honeycomb core body 1, said honeycomb core body 1 formed by superposing a planar band 11 made of a metal sheet and a corrugated band 12 made from another metal sheet one over the other in a contiguous relationship and then rolling the thus-superposed planar band and corrugated band together into a multilayered spiral form to define a number of network-patterned axial gas flow passages 13 and being adapted to carry an exhaust gas cleaning catalyst thereon, the improvement comprising means defining an open cylindrical hollow space within the honeycomb core body 1 along the central axis of rolling thereof wherein the open cylindrical hollow space 14 is of an outer diameter satisfying the following relationship:

$$\frac{20}{100}\phi_1 \leq \phi_2 \leq \frac{95}{100}\phi_1$$

wherein
- $\phi_1$: the outer diameter of the honeycomb core body, and
- $\phi_2$: the outer diameter of the cylindrical hollow space; and outer casing means 2 having an inner diameter $\phi_1$ for closely fitting around the honeycomb core body while enabling the presence of the cylindrical hollow space of diameter $\phi_2$ therein.

The formation of the cylindrical hollow space along the central axis of rolling thereof has brought about excellent advantageous effects such that the exhaust gas cleaning device according to the present invention is protected from being heated to abnormally high temperatures around the center thereof when cleaning exhaust gas having a high HC content, the output of an associated internal engine is not reduced owing to a smaller resistance to the flow of exhaust gas, and the exhaust gas cleaning device can be used as a preheater or the like also owing to the smaller resistance to the flow of exhaust gas.

DETAILED DESCRIPTION OF THE INVENTION AND PREFERRED EMBODIMENTS

Figure 1:
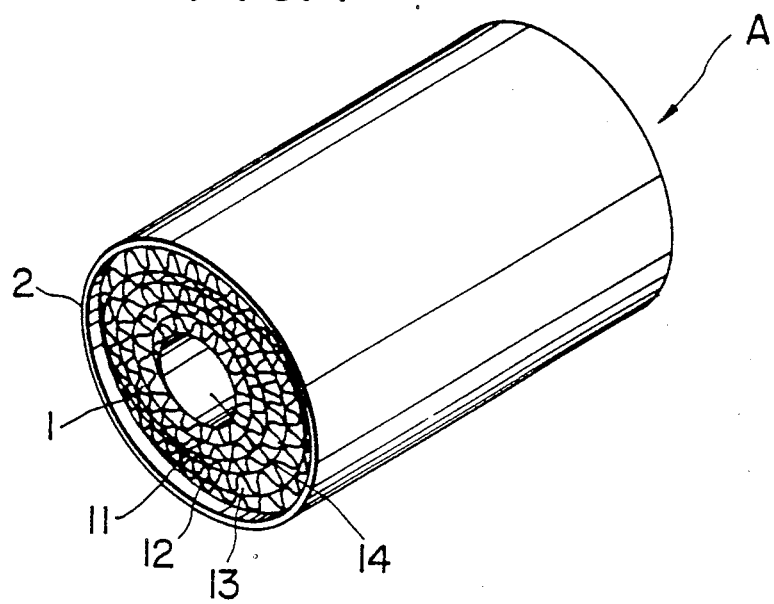
FIG. 1 is a perspective view of an exhaust gas cleaning device according to a first embodiment of the present invention.

Technical features and preferred embodiments of the present invention will hereinafter be described in more detail on the basis of the accompanying drawings. It should however be borne in mind that the present invention is not limited to those illustrated in the drawings.

In the present invention, the metal-made honeycomb core body is such a body as shown in FIG. 1 and is fabricated in a conventional manner.

A honeycomb core body 1 is fabricated by superposing a planar band 11 and a corrugated band 12 one over the other in a contiguous relationship and then rolling them together into a multilayered spiral form with the outermost peripheral wall being formed of the planar band. The planar band 11 is formed of a heat-resistant steel sheet and has a thickness of about 0.03–0.1 mm, while the corrugated band 12 has been obtained by corrugating a similar steel sheet into such a special waveform as will be described subsequently. By the rolling into the multilayered spiral form, there are automatically formed a number of network-patterned axial gas flow passages 13 which serve as flow passages for exhaust gas.

The planar band 11, is preferably formed of a 0.04–0.1 mm thick sheet which is made of a heat-resistant stainless steel such as chromium steel (chromium content: 13–25%) or Fe-Cr20%-Al5%, or is made of a heat-resistant stainless steel formed by adding a rare earth metal, such as Ce or Y, to the former stainless steel to improve the oxidation resistance. For the corrugated band 12, a similar stainless steel sheet is used after its corrugation into the special waveform to be described later, for example, by feeding the same between forming gears. Use of an Al-containing stainless steel sheet to form each of the bands is preferred because $Al_2O_3$ is formed as whiskers on the surfaces of the band by heat treatment and serves to firmly hold an underlayer adapted to bear an exhaust gas cleaning catalyst, the under layer being referred to as "a wash coat".

The honeycomb core body 1 useful in the practice of the present invention defines a cylindrical hollow space 14 of a predetermined outer diameter along the central axis of rolling thereof.

The honeycomb core body 1 with the hollow space 14 can be used not only as a preheater or the like but also as a principal component for the purification of exhaust gas.

Accordingly, the outer diameter of the hollow space 14 can be determined by taking into consideration, the manner of its use, the degree of pressure loss, the regulation for the cleaning of exhaust gas (emission control e.g., the details of desired HC control, etc. To make it possible to apply the honeycomb core body 1 to both the applications described above, the cylindrical hollow space (14) formed in the honeycomb core body 1 along the central axis of rolling thereof has an outer diameter satisfying the following formula:

$$\frac{20}{100}\phi_1 \leq \phi_2 \leq \frac{95}{100}\phi_1$$

wherein
- $\phi_1$: the outer diameter of the honeycomb core body, and
- $\phi_2$: the outer diameter of the cylindrical hollow space.

In the present invention, one or more reinforcement members of a desired shape such as metal-made cylinders or cruciform ribs can be disposed in the hollow space 14 to reinforce the honeycomb core body 1.

These reinforcement members may extend along the entire axial length of the honeycomb core body 1 or along a portion of the axial length. As an alternative, plural reinforcement members having desired widths can be arranged at predetermined axial intervals. When employed especially as a preheater or the like, the honeycomb core body 1 is disposed near an associated exhaust manifold. In such a case, coarsening the openings of the network-patterned air flow passages 13 may be beneficial with a view toward lowering the resistance to the flow of exhaust gas. Use of one or more reinforcement members is then important for such an embodiment because coarse openings lead to a reduction in the rigidity of the honeycomb core body 1. Among the reinforcement members exemplified above, the cylindrical reinforcement members can serve as a guide or core for a rolling operation when the planar band 11 and corrugated band 12 are rolled into a multilayered composite body. It is therefore preferred to use such a reinforcement member.

The honeycomb core body which has been fabricated by rolling the planar band 11 and the corrugated band 12 into the multilayered composite body and defines the hollow space 14 along the central axis of rolling thereof can be used as an exhaust gas cleaning device by itself. In such a case, an end portion of the planar band can be wound a desired number of times around the outermost periphery of the honeycomb core body 1 as a substitute for a metal casing. As a further alternative, the honeycomb core body 1 can be inserted in and fixed to a separate cylindrical metal casing 2 to provide an exhaust gas cleaning device as shown in FIG. 1.

In the present invention, a similar heat-resistant steel to the honeycomb core bore 1 or a material having high heat and corrosion resistance can be used as the material for the metal casing 2 in which the honeycomb core body 1 is fixedly inserted. In addition, it is also possible to use a double-layered material with an outer layer being made of a metal material having higher heat and corrosion resistance than the metal material of an inner layer, specifically to employ a clad steel made of a ferritic stainless steel as an inner layer and an austenitic stainless steel as an outer layer.

The metal-made honeycomb core body 1 defining the cylindrical hollow space 14, which is an essential element of the exhaust gas cleaning device of the present invention, will hereinafter be described in further detail with reference to the accompanying drawings.

Figure 2:
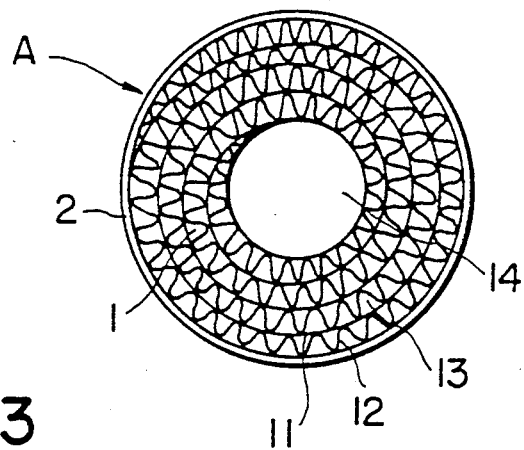
FIG. 2 is a front view of the exhaust gas cleaning device of the first embodiment.
Figure 3:
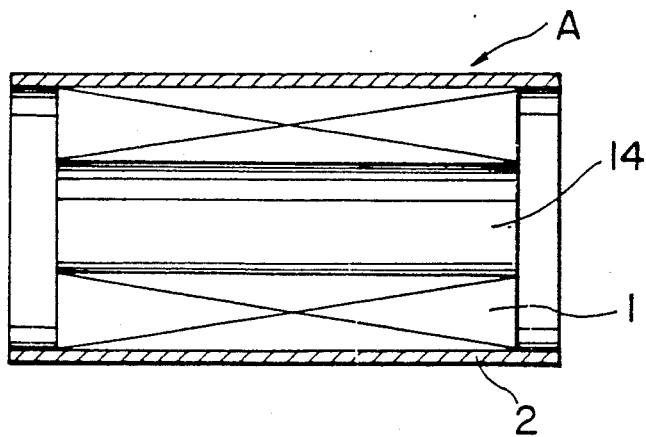
FIG. 3 is an axial cross-sectional view of the exhaust gas cleaning device of the first embodiment.

(i) FIGS. 1-3 illustrate the honeycomb core body 1 according to the first embodiment of the present invention, which defines a hollow space 14.

Used in the first embodiment are a planar band 11 and a corrugated band 12. The planar band 11 is formed of a steel sheet made of a heat resistant steel of the Fe-Cr20%-Al5%-Ce0.02% type and having a thickness of 0.04 mm. The corrugated band 12 is formed by feeding a similar steel sheet between forming gears and has a ridge-to-ridge pitch of 3.5 mm and a ridge height of 1.8 mm.

The planar band 11 and corrugated band 12 are superposed one over the other in a contiguous relationship. Using a slitted mandrel having an outer diameter of 30 mm, the planar band 11 and corrugated band 12 thus superposed are spirally rolled together, thereby fabricating the honeycomb core body 1 defining a number of network-patterned axial air flow passages 13 and having an outer diameter of 50 mm. Thereafter, the mandrel is pulled out to form a cylindrical hollow space having an outer diameter of 30 mm along the central axis of rolling of the honeycomb core body 1.

The honeycomb core body 1 is then inserted in a metal casing having an inner diameter of about 50 mm and made of a heat-resistant steel (JIS G4305 SUS310). Both end portions of the honeycomb core body and adjacent portions thereof (regions up to 10 mm inside from both ends) are dipped in a slurry of a nickel-base brazing material. After the slurry is dried, heat treatment is conducted in a vacuum furnace so that the honeycomb core body and metal casing are fixed together by brazing.

Figure 4:
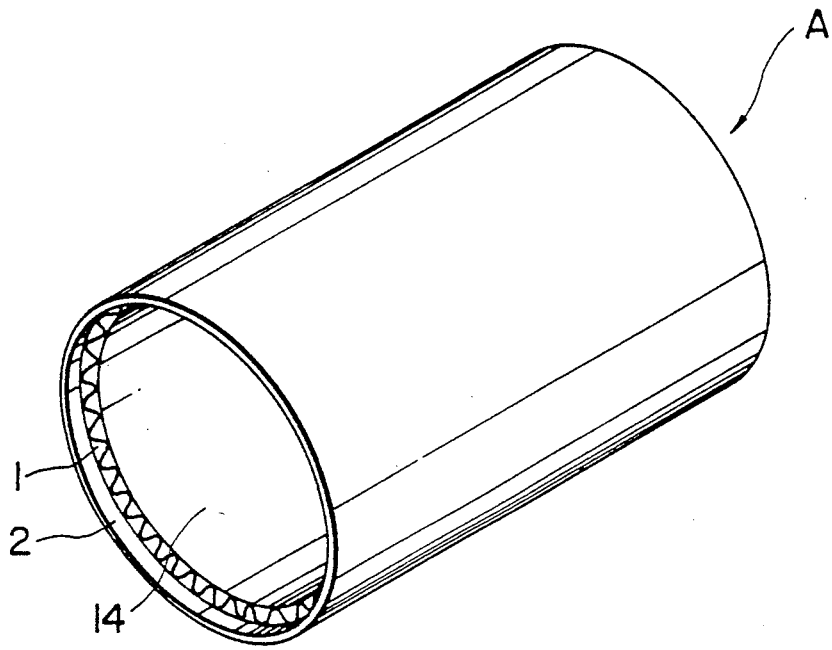
FIG. 4 is a perspective view of an exhaust gas cleaning device according to a second embodiment of the present invention.
Figure 5:
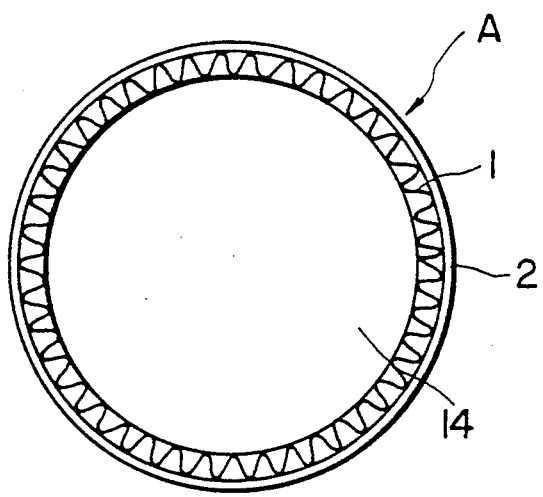
FIG. 5 is a front view of the exhaust gas cleaning device of the second embodiment.

(ii) FIGS. 4-5 illustrate the honeycomb core body 1 according to the second embodiment of the present invention, which defines a hollow space 14. In the second embodiment, the honeycomb core body 1 is fabricated by rolling a planar band 11 and a corrugated band 12 once into a multilayered composite body.

Figure 6:
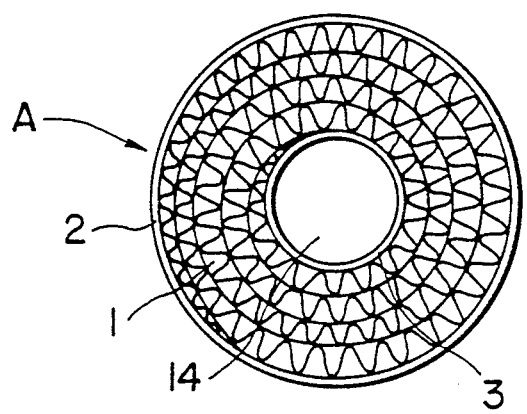
FIG. 6 is a perspective view of an exhaust gas cleaning device according to a third embodiment of the present invention.
Figure 7:
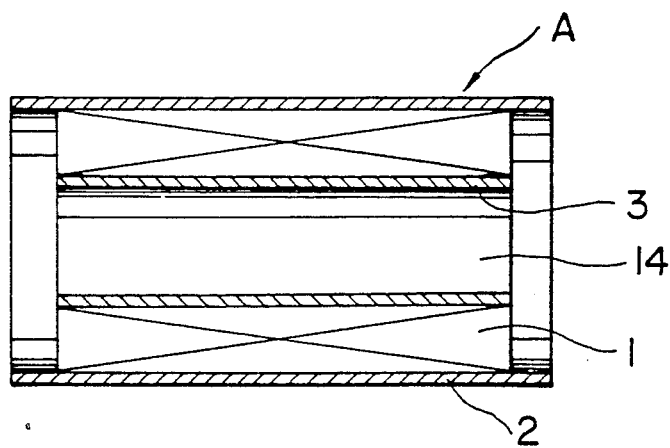
FIG. 7 is an axial cross-sectional view of the exhaust gas cleaning device of the third embodiment.

(iii) FIGS. 6-7 show the honeycomb core body 1 according to the third embodiment of the present invention, which defines a hollow space 14. In the third embodiment, the inner peripheral wall of the honeycomb core body 14 is supported by a cylinder 3 which extends along the entire axial length of the honeycomb core body 1.

Figure 8:
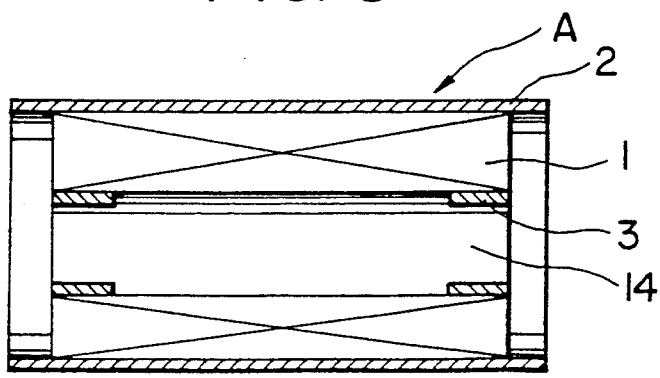
FIG. 8 is an axial cross-sectional view of an exhaust gas cleaning device according to a fourth embodiment of the present invention.

(iv) FIG. 8 depicts the honeycomb core body 1 according to the fourth embodiment of the present invention, which defines a hollow space 14. The fourth embodiment is a modification of the third embodiment (FIGS. 6-7) described above. The inner peripheral wall of the honeycomb core body 14 is not supported over the entire axial length thereof, but short cylinders 3 of a desired length are arranged in both end portions of the honeycomb core body 1.

Figure 9:
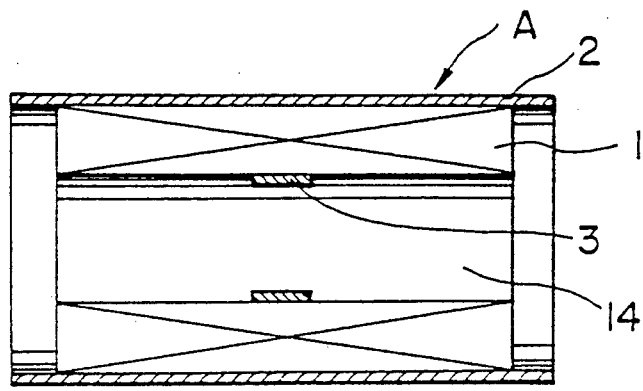
FIG. 9 is an axial cross-sectional view of an exhaust gas cleaning device according to a fifth embodiment of the present invention.

(v) FIG. 9 illustrates the honeycomb core body 1 according to the fifth embodiment of the present invention, which defines a hollow space 14. The fifth embodiment is also a modification of the third embodiment (FIGS. 6-7) described above. A cylinder 3 does not extend along the entire axial length of the honeycomb core body 1. The cylinder 3 has a desired shorter length and is arranged in a longitudinal central part of the hollow space 14.

Figure 10:
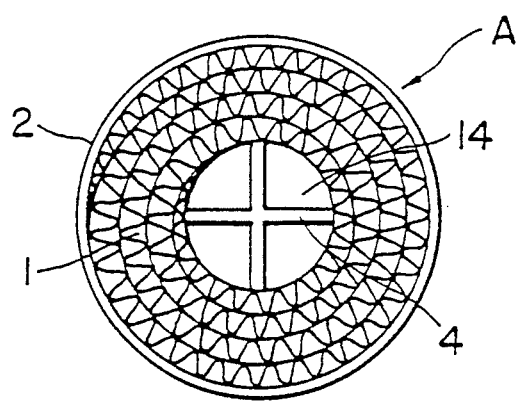
FIG. 10 is a front view of an exhaust gas cleaning device according to a sixth embodiment of the present invention.

(vi) FIG. 10 shows the honeycomb core body 1 according to the sixth embodiment of the present invention, which defines a hollow space 14. In the sixth embodiment, a cruciform reinforcement rib 4 supports the inner peripheral wall of the honeycomb core body 1. The arrangement of the reinforcement rib 4 can be achieved in a similar manner to the arrangement of the cylinder 3 shown in FIGS. 7-9.

Figure 11:
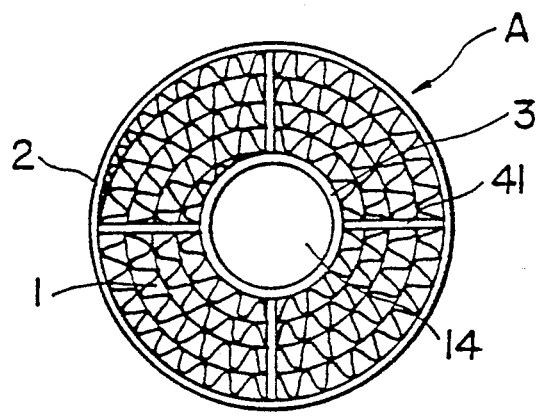
FIG. 11 is a front view of an exhaust gas cleaning device according to a seventh embodiment of the present invention.

(vii) FIG. 11 illustrates the honeycomb core body 1 according to the seventh embodiment of the present invention, which defines a hollow space 14. In the seventh embodiment, the honeycomb core body 1 is fixed in a metal casing 2, the inner peripheral wall of the honeycomb core body 1 is supported by a metal-made cylinder 3, and reinforcement ribs (41) are disposed between the metal casing 2 and the cylinder 3.

Figure 12:
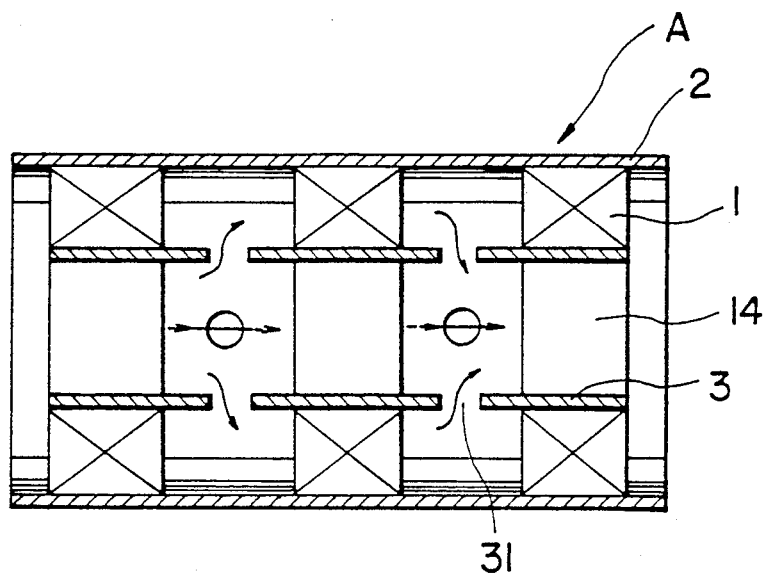
FIG. 12 is an axial cross-sectional view of an exhaust gas cleaning device according to an eighth embodiment of the present invention.

(viii) FIG. 12 depicts the honeycomb core bodies 1 according to the eighth embodiment of the present invention, which defines hollow spaces 14, respectively. In the eighth embodiment, the honeycomb core bodies 1 defining along the central axis thereof cylindrical hollow spaces 14 of the same outer diameter respectively are disposed at desired intervals within a metal casing 2. The inner peripheral walls of the individual honeycomb core bodies 1 are supported by a common metal-made cylinder 3, which has the same outer diameter as the hollow spaces 14 and extends along the axis of the metal casing 2. Incidentally, as a modification of the eighth embodiment, holes 31 may be bored through the wall of the metal cylinder 3 at locations between the individual honeycomb core bodies as shown in the drawing, so that the flow of exhaust gas can be converted into a turbulent flow to improve the efficiency of cleaning of the exhaust gas. Needless to say, louvers or the like can also be formed by lancing or the like to develop stronger turbulence, although the drawing simply shows the holes 31 alone.

Figure 13:
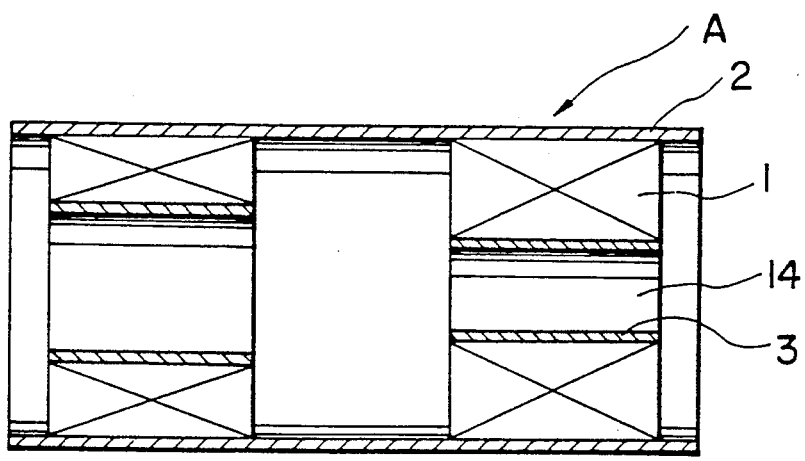
FIG. 13 is an axial cross-sectional view of an exhaust gas cleaning device according to a ninth embodiment of the present invention.

(ix) FIG. 13 illustrates the honeycomb core bodies 1 according to the ninth embodiment of the present invention, which define hollow spaces 14, respectively. Plural honeycomb core bodies 1 defining the cylindrical hollow spaces 14 of different diameters along the central axes of rolling thereof are arranged at a desired interval within a metal casing 2. Further, the inner peripheral walls of the honeycomb core bodies 1 are supported by their corresponding metal-made cylinders 3. In the ninth embodiment, the outer diameters of the individual cylindrical hollow spaces 14 can be determined in view of a predetermined pressure loss of exhaust gas, a desired degree of cleaning of exhaust gas, etc.

In this disclosure, there are shown and described only the preferred embodiments of the invention, but, as aforementioned, it is to be understood that the invention is capable of use in various other combinations and environments and is capable of changes or modifications within the scope of the inventive concept as expressed herein.

What is claimed is:

1. An improved exhaust gas cleaning device comprising:
   a honeycomb core body, said honeycomb core body formed by superposing a planar band made of a metal sheet and a corrugated band made from another metal sheet one over the other in a contiguous relationship and then rolling the thus-superposed planar band and corrugated band together into a multilayered spiral form to define a number of network-patterned axial gas flow passages and carrying an exhaust gas cleaning catalyst thereon, the improvement comprising
   means defining an open cylindrical hollow space within the honeycomb core body, along the central axis of rolling thereof, wherein the open cylindrical hollow space has a diameter satisfying the following relationship $$\frac{20}{100} \cdot \phi_1 \leq \phi_2 \leq \frac{95}{100} \cdot \phi_1$$

wherein
   $\phi_1$ is the outer diameter of the honeycomb core body, and
   $\phi_2$ is the diameter of the cylindrical hollow space; and
   outer casing means having an inner diameter $\phi_1$ closely fitting around the honeycomb core body while the presence of the open cylindrical hollow space of diameter $\phi_2$ is maintained therein.

2. The device of claim 1, wherein the outer casing means comprises:
   a cylindrical metal casing, with the honeycomb core body being rolled at least once and disposed therein,
   wherein the outermost peripheral surface of the honeycomb core body is joined to the inner wall of the cylindrical metal casing.

3. The device of claim 1, wherein:
   the honeycomb core body has an inner peripheral wall which is supported on an outer surface of a metal cylinder of a predetermined outer diameter $\phi_2$.

4. The device of claim 3, wherein:
   the metal cylinder extends along at least a portion of the honeycomb core body in the direction of the central axis of rolling of the honeycomb core body.

5. The device of claim 1, wherein:
   the inner peripheral wall of the honeycomb core body is supported by at least one metal reinforcement rib.

6. The device of claim 5, wherein:
   the at least one metal reinforcement rib is cruciform.

7. The device of claim 5, wherein:
   the at least one metal reinforcement rib extends along at least a portion of the honeycomb core body in the direction of the central axis of rolling of the honeycomb core body.

8. The device of claim 1, wherein the outer casing means comprises:
   a metal casing within which the honeycomb core body is fixed.

9. The device of claim 1, wherein:
   the outer casing means comprises a metal casing, the honeycomb core body is fixed in the metal casing, the inner peripheral wall of the honeycomb core body is supported by a metal cylinder, and at least one reinforcement rib is arranged between the metal casing and the metal cylinder.

10. The device of claim 1, wherein:
    the outer casing means comprises a metal casing, a plurality of honeycomb core bodies, each defining a cylindrical hollow space of the same diameter $\phi_2$ along a central axis of rolling thereof, are arranged at desired intervals in the metal casing, and inner peripheral walls of the individual honeycomb core bodies are supported by a single metal cylinder extending along an axis of the metal casing.

11. The device of claim 10, wherein:
    the metal cylinder is formed with at least one through-hole therein, the through-hole being located axially between at least two adjacent ones of the honeycomb core bodies.

12. The device of claim 1, wherein:
    the outer casing means comprises a metal casing, a plurality of honeycomb core bodies, each defining a cylindrical hollow space of a different diameter along a central axis of rolling thereof, are arranged at predetermined locations in the metal casing, and the respective inner peripheral walls of the individual honeycomb core bodies are supported by metal cylinders having respectively corresponding outer diameters.

* * * * *